US012700913B2

(12) United States Patent
Khanka et al.

(10) Patent No.: US 12,700,913 B2
(45) Date of Patent: Aug. 4, 2026

(54) TERRESTRIAL MULTI-ANTENNA SYSTEM FOR AIRBORNE WIRELESS SERVICE

(71) Applicant: T-MOBILE INNOVATIONS LLC, Overland Park, KS (US)

(72) Inventors: Bhagwan Singh Khanka, Las Vegas, NV (US); Brandon James Braunlich, Henderson, NV (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/799,800

(22) Filed: Aug. 9, 2024

(65) Prior Publication Data
US 2026/0046015 A1     Feb. 12, 2026

(51) Int. Cl.
H04B 7/155        (2006.01)
H04B 7/06         (2006.01)
H04L 5/00         (2006.01)

(52) U.S. Cl.
CPC ......... H04B 7/15585 (2013.01); H04B 7/068 (2013.01); H04L 5/0041 (2013.01)

(58) Field of Classification Search
CPC .... H04B 7/15585; H04B 7/068; H04L 5/0041
See application file for complete search history.

(56) References Cited

U.S. PATENT DOCUMENTS

| | | | |
|---|---|---|---|
| 8,868,069 B2 | 10/2014 | Bennett et al. | |
| 11,101,874 B1 | 8/2021 | Yerli | |
| 2010/0035600 A1* | 2/2010 | Hou ....................... | H04B 7/024 |
| | | | 455/562.1 |
| 2017/0367053 A1* | 12/2017 | Noh .................... | H04W 52/367 |
| 2020/0220612 A1* | 7/2020 | Thomas ............... | H04B 17/345 |
| 2021/0195448 A1* | 6/2021 | Zhao .................... | H04W 24/08 |
| 2022/0232463 A1 | 7/2022 | Sadique et al. | |
| 2024/0381280 A1* | 11/2024 | Mansour ........... | H04B 7/18515 |

FOREIGN PATENT DOCUMENTS

WO     WO-2021228381 A1 * 11/2021 ............ H04W 24/10

OTHER PUBLICATIONS

International Search Report and Written Opinion received for PCT Patent Application No. PCT/US2025/040835, mailed on Oct. 14, 2025, 6 pages.

* cited by examiner

*Primary Examiner* — Chieh M Fan
(74) *Attorney, Agent, or Firm* — SHOOK, HARDY & BACON L.L.P.

(57)        ABSTRACT
Embodiments of the present disclosure are directed to systems and methods for delivering telecommunications coverage to airborne user equipment (UE). More particularly, in aspects set forth herein, systems and methods utilize a multi-antenna system at a terrestrial base station in order to separately communicate signals to UEs at (or near) ground level and to UEs that are airborne.

17 Claims, 4 Drawing Sheets

300

302

DETERMINE WHETHER RADIO
ENVIRONMENT IS FAVORABLE TO NON-
CONTIGUOUS SPECTRUM USE

304

DETERMINE UE CAPABILITIES

306

ALLOCATE NON-CONTIGUOUS CHANNEL
RESOURCES

TERRESTRIAL MULTI-ANTENNA SYSTEM FOR AIRBORNE WIRELESS SERVICE

SUMMARY

The present disclosure is directed to delivering telecommunications coverage to an airborne user equipment (UE), substantially as shown and/or described in connection with at least one of the Figures, and as set forth more completely in the claims.

According to various aspects of the technology, in aspects set forth herein, systems and methods utilize a multi-antenna system at a base station in order to separately communicate signals to UEs at (or near) ground level and to UEs that are airborne. Historically, airborne UEs have been served using satellite-based wireless networks for various reasons, including to avoid interference with avionics, handover difficulties, and low return on investment due to the relatively low density of airborne UEs. As the number and types of airborne UEs increase, traditional factors that weighed against the use of terrestrial base stations for serving airborne UEs may be reconsidered.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
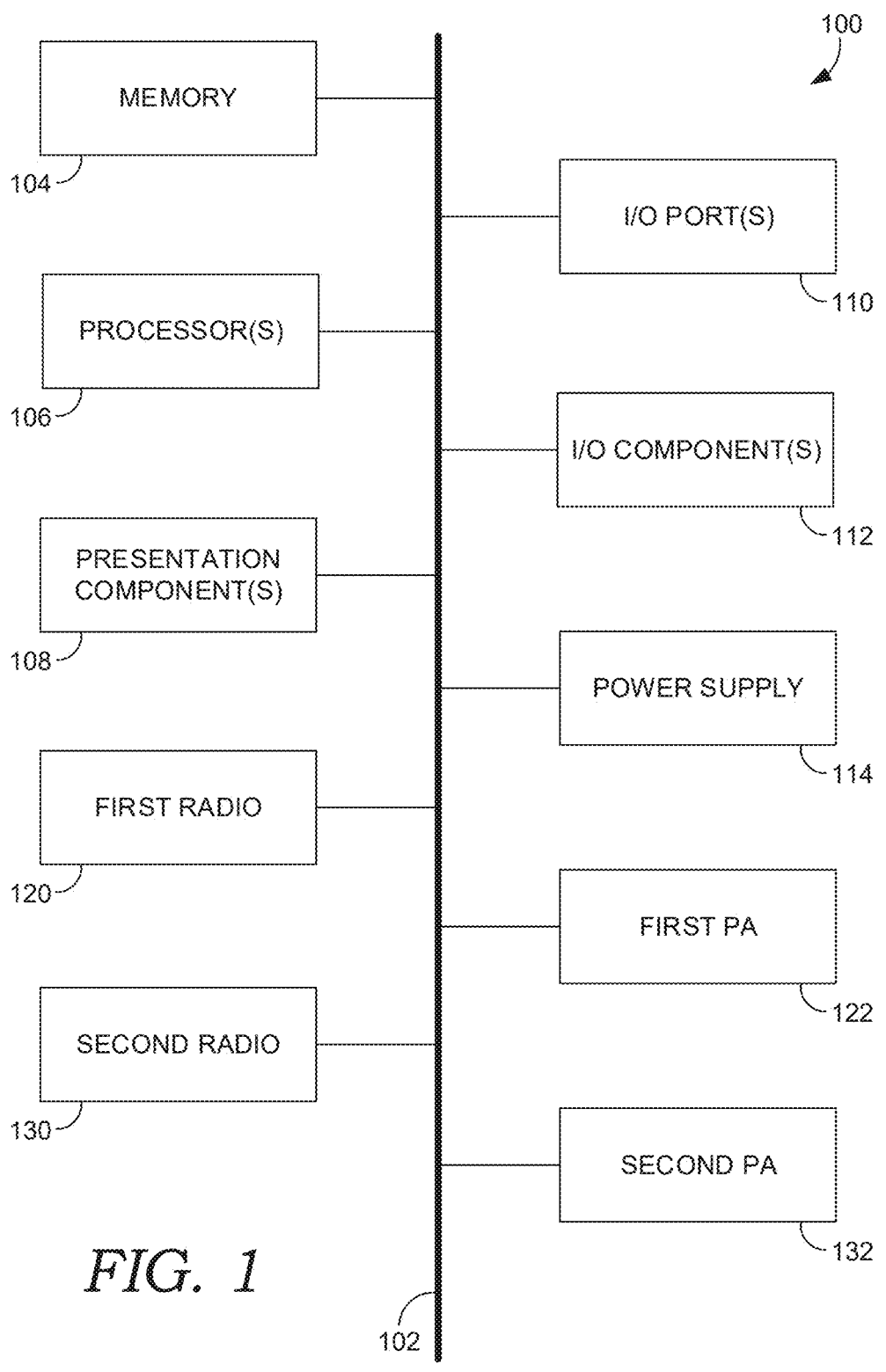
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, airborne UEs, whether drones or individual UEs on airplanes, often operate outside of conventional transmission patterns for terrestrial radio access networks, which are configured to provide service for UEs at or near ground level. Accordingly, reliable connections between airborne UEs and terrestrial networks are challenging. At lower altitudes, typically well below 10,000 feet, telecommunication signals may be accessible at or near the vertical high-end of cell edges as the UE is within range of base stations; however, airborne-bound UEs are typically only at such altitudes during takeoff and landing, limiting service for customers to the most consequential phases of flight.

Conventionally then, airborne UEs are only incidentally served by existing terrestrial networks. The manipulation of existing antenna systems at a base station to more readily facilitate wireless connections with UEs at greater altitudes would necessitate those antenna systems to sacrifice terrestrial coverage in order to shift a coverage footprint upward. Though satellite radio access networks could be used to provide service to airborne UEs, the cost and complexity of developing and launching satellite systems limits their practical use for up to hundreds of UEs on each flight—of which dozens or hundreds could exist in a single satellite cell. Some air carriers have deployed hotspots for use by passenger UEs that utilize satellite backhauls; however, installation and maintenance of systems integrated into airframes is costly and prone to technical obsolescence. Moreover, using satellite backhauls are expensive and bandwidth-constrained.

Unlike conventional approaches, the present disclosure is directed to a terrestrial multi-antenna system for communicating with both UEs at or near the ground and airborne UEs. Each terrestrial base station comprises a first set of antennas configured, conventionally, to communicate with UEs at or near the ground level, and a second set of antennas configured, whether physically, electronically, or both, to communicate upward in order to provide coverage to UEs that are airborne. Signals transmitted and received by each of the two sets of antennas may be separated according to various schemes in order to prevent interference between the terrestrial cell and the airborne cell.

Accordingly, a first aspect of the present disclosure is directed to a terrestrial multi-antenna system for providing airborne wireless service. The system comprises a controller, a first antenna panel, and a second antenna panel. The first antenna panel has a first tilt that is configured to communicate a first set of wireless signals to a first coverage area. The second antenna panel has a second tilt that is configured to communicate a second set of wireless signals to a second coverage area. The controller is configured to utilize one or more interference mitigation measures to prevent the first set of wireless signals from interfering with the second set of wireless signals.

A second aspect of the present disclosure is directed to a method for a terrestrial multi-antenna system to provide airborne wireless service. The method comprises a first antenna panel and a second antenna panel. The method comprises communicating a first set of wireless signals from a first antenna panel having a first tilt to a first coverage area. The method further comprises communicating a second set of wireless signals from a second antenna panel having a second tilt to a second coverage area. The method further comprises a controller that utilizes one or more interference mitigation measures to prevent the first set of wireless signals from interfering with the second set of wireless signals.

A third aspect of the present disclosure is directed to a non-transitory computer readable media containing computer executable instructions thereon that, when executed by one or more computer processing components, cause the one or more computer processing components to perform a method of providing airborne wireless service to a user equipment (UE). Said method comprises communicating a first set of wireless signals from a first antenna system to a terrestrial cell using a terrestrial base station, wherein the first set of wireless signals uses a first frequency and wherein the first set of wireless signals comprises a synchronization signal having a first public land mobile network (PLMN) identifier. The method further comprises communicating a second set of wireless signals from a second antenna system to an airborne cell using the terrestrial base station, wherein the second set of wireless signals uses a second frequency, and wherein the second set of wireless signals comprises a synchronization signal having a second PLMN identifier, the first frequency being different than the second frequency, the first PLMN identifier being different than the second PLMN identifier, the airborne cell and the terrestrial cell having main lobes that have a non-zero and positive angular separation in a vertical plane.

Another aspect of the present disclosure is directed to a non-transitory computer readable media having instructions stored thereon that, when executed by one or more computer processing components, cause the one or more computer processing components to perform a method for location-based cell search. The method comprises a first antenna panel and a second antenna panel. The method comprises communicating a first set of wireless signals from a first antenna panel having a first tilt to a first coverage area. The method further comprises communicating a second set of wireless signals from a second antenna panel having a second tilt to a second coverage area. The method further comprises a controller that utilizes one or more interference mitigation measures to prevent the first set of wireless signals from interfering with the second set of wireless signals.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2A:
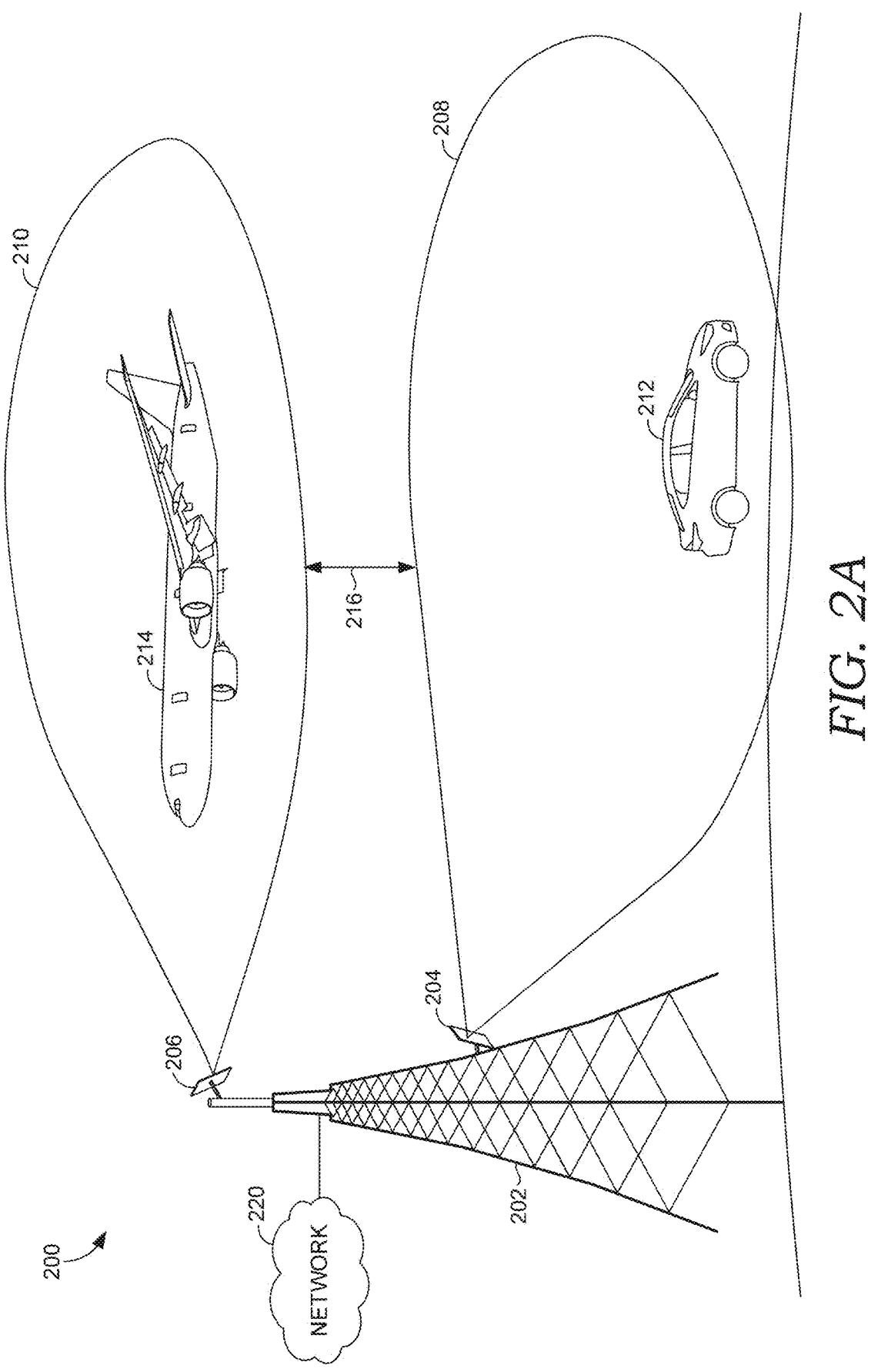
FIGS. 2A and 2B. illustrate exemplary environments in which implementations of the present disclosure may be employed.
Figure 2B:
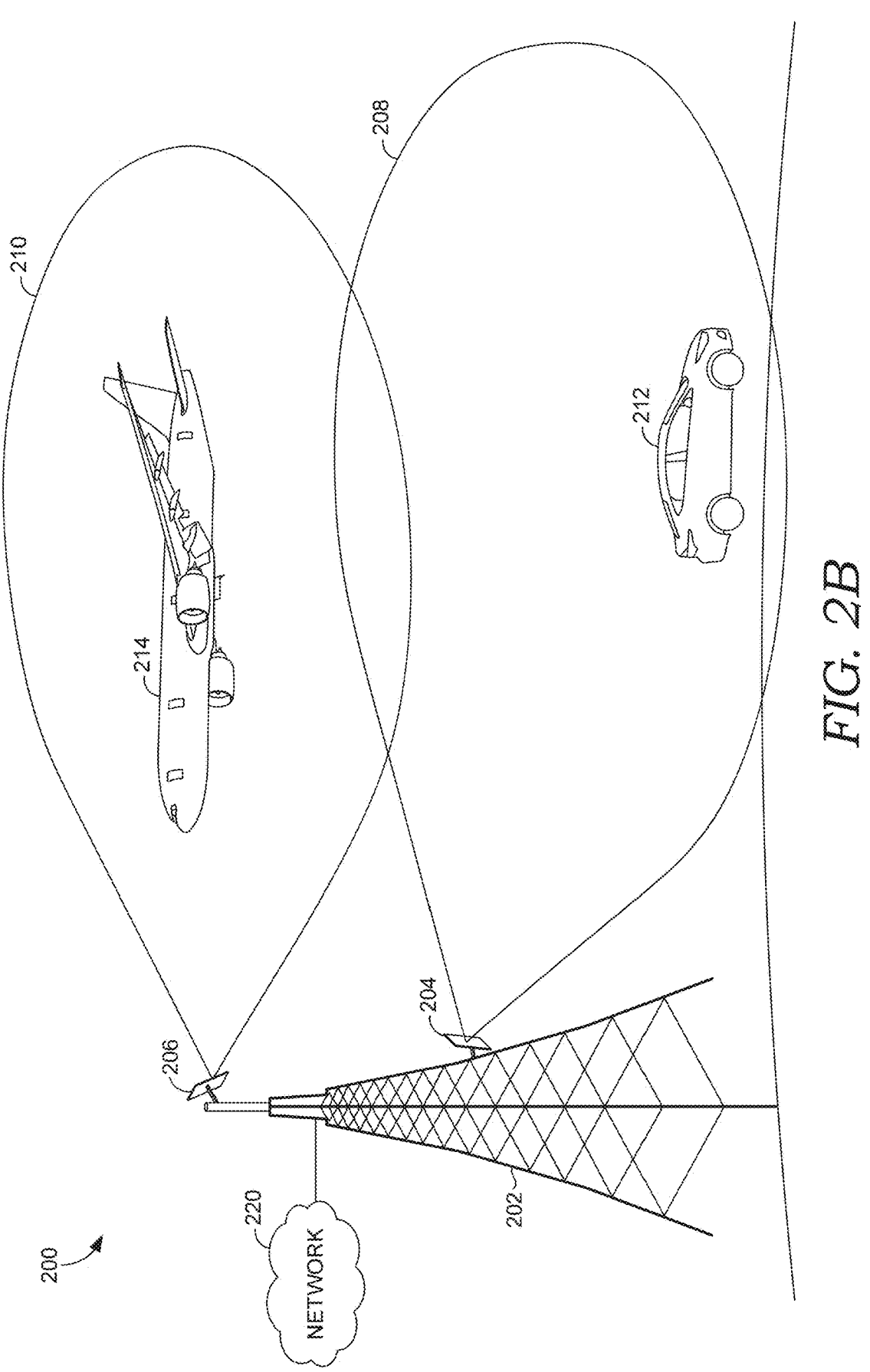

Turning now to FIGS. 2A and 2B, exemplary network environments are illustrated in which implementations of the present disclosure may be employed. Such a network environment is illustrated and designated generally as network environment 200. At a high level the network environment 200 comprises a terrestrial UE 212 (depicted as a connected car on the ground) and having a first coverage area 208, an airborne UE 214 (depicted as a user flying in an airplane) and having a second coverage area 210, one or more base stations (e.g., base station 202), and one or more networks (e.g., network 220). Though the terrestrial UE 212 is illustrated as a car, a UE suitable for implementations with the present disclosure may be any computing device that it connected to a base station and is utilizing a terrestrial coverage area (e.g., first coverage area 208) having any one or more aspects described with respect to FIG. 1. Additionally, though the airborne UE 214 is illustrated as an airplane, a UE suitable for implementations with the present disclosure may be any computing device, such as a drone, that is connected to a base station and is utilizing an airborne coverage area (e.g., second coverage area 210) having any one or more aspects described with respect to FIG. 1. Similarly, though the base station 202 is illustrated as a macro cell on a cell tower, any scale or form of access point acting as a transceiver station for wirelessly communicating with a UE, including small cells, pico cells, and the like, are suitable for use with the present disclosure.

The network environment 200 comprises a terrestrial-based base station 202 with one or more antenna panels to which both the terrestrial UE 212 and the airborne UE 214 may potentially connect to (also referred to as 'camping on', 'attaching' in the industry). For the present disclosure, a terrestrial-based base station refers to a base station (e.g., base station 202) that is located on land, as opposed to being positioned in air or space. Though the network environment 200 is illustrated with one base station 202, one skilled in the art will appreciate that more base stations may be present in any particular network environment. The base station 202 of network environment 200 may comprise one or more of a first antenna panel 204 and a second antenna panel 206. The first antenna panel 204 and the second antenna panel 206 are both communicatively coupled to base station 202. In aspects, the first antenna panel 204 could be coupled to, and therefore unitary with, the second antenna panel 206 (not shown). Each of the one or more antenna panels of the network environment 200 is configured to wirelessly communicate with UEs, such as the terrestrial UE 212 and the airborne UE 214. In aspects, each of the first antenna panel 204 and the second antenna panel 206 can comprise a plurality of antenna elements. Any of the one or more base stations may communicate with a UE using any wireless telecommunication protocol desired by a network operator, including but not limited to 3G, 4G, 5G, 6G, 802.11x and the like. Relevant to the present disclosure, each of the one or more base stations is associated with a network identifier (e.g., a Public Land Mobile Network (PLMN) number). In some implementations, each of the one or more base stations is configured to communicate with one or more UEs located within a geographical area. The geographical area for any particular base station may be referred to as the "coverage area" of the base station or simply the "cell," as used interchangeably hereinafter. In some aspects, the coverage area for each particular base station is defined by an area in which signaling between a particular UE and the base station is usable for any purpose; in other aspects, the coverage area may be defined by mobile network operators. Generally, each base station may comprise one or more base transmitter stations, radios, antennas, antenna arrays, power amplifiers, transmitters/receivers, digital signal processors, control electronics, GPS equipment, and the like.

The base station 202 is configured to transmit downlink signals to one or more UEs, such as the terrestrial UE 212 and airborne UE 214 and to receive uplink signals therefrom. Specifically, the downlink signals from a particular base station may comprise one or more sets of synchronization signals that serve to provide information about that particular base station, such as primary synchronization signals (PSS), secondary synchronization signals (SSS), and physical broadcast channel (PBCH) signals. The downlink signals may additionally comprise various other control and broadcast signaling in addition to physical downlink shared channel (PDSCH) signaling.

The base station 202 may be associated with one or more at least partially distinct networks, wherein each network is associated with one or more network identifiers. Each network may be a telecommunications network(s) (e.g., a packet data network or core network), data network, or portions thereof. A telecommunications network that at least partially comprises the network environment 200 may include additional devices or components (e.g., one or more base stations) not shown. Those devices or components may form network environments similar to what is shown in FIGS. 2A and 2B, and may also perform methods in accordance with the present disclosure. Components such as terminals, links, and nodes (as well as other components) may provide connectivity in various implementations. For the purposes of illustrating the present disclosure, the base station 202 may be connected to the network 220. The network 220 may include multiple networks, as well as being a network of networks, but is shown in more simple form so as to not obscure other aspects of the present disclosure.

A multi-antenna base station for simultaneously providing service to terrestrial and airborne UEs is shown in FIGS. 2A and 2B. The first antenna panel 204 has a first tilt that is configured to communicate a first set of wireless signals to the first coverage area 208. In network environment 200, the first coverage area 208 is configured to communicate with a plurality of UEs (e.g., terrestrial UE 212) on or near the ground (e.g., less than 250 feet from above ground level (AGL)). The second antenna panel 206 has a second tilt that is configured to communicate a second set of wireless signals to the second coverage area 210, wherein the first tilt is different than the second tilt. In network environment 200, the second coverage area 210 is configured to communicate with a plurality of airborne UEs (e.g., airborne UE 214). In this disclosure, the second coverage area 210 does not comprise areas on or near the ground.

In order to minimize inter-cell interference between terrestrial cells such as the first coverage area 208 and airborne cells such as the second coverage area 210, the base station 202 may utilize one or more interference mitigation measures. As illustrated in FIG. 2A, in instances where channel re-use is desired between the terrestrial and airborne cells (e.g., both cells use band 2 around 1900 MHz), beamforming alone or in combination with physical tile can be used to provide vertical inter-cell separation 216. The separation 216, when viewed in the illustrated vertical plane, is an angular distance that separates the upper vertical edge of the first coverage area 208 and the lower vertical edge of the second coverage area 210. The present disclosure considers any non-zero positive value to be sufficient angular vertical separation between the first coverage area 208 and the second coverage area 210 in order to reduce vertical inter-cell interference. Additionally, or alternatively, a differential orthogonal code could be applied to signaling in one or more of the first coverage area 208 and the second coverage area 210 in order to minimize the inter-cell interference.

Turning now to FIG. 2B, it may not be necessary that the first coverage area 208 and the second coverage area 210 are exclusive of each other. In such an instance, and even if said coverage areas were configured to not overlap, different frequencies may be used to serve each of the first coverage area 208 and the second coverage 210. The configuration of the first coverage area 208 and the second coverage area 210 may be based on several factors, including but not limited to power limitations, flight path concentration, terrestrial obstructions, and terrestrial UE density. For example, if the base station 202 was in an open rural area with few terrestrial obstructions, relatively low terrestrial UE density, and located on a highly traveled airway (e.g., a J-Route or a Q-Route in the USA), then the first coverage area 208 may be served by the first antenna panel 204 having lower directionality/beamforming, a lower frequency, and lower power; whereas, the second coverage area 210 may be served by the second antenna panel 206 having higher directionality/beamforming (focusing service co-axial with the highly-traveled airway), a higher frequency (to serve a greater number of airborne UEs in a particularly localized area), and higher power (due to the minimum distance from the second panel 206 being much greater). One skilled in the art can appreciate there are a vast number of configuration combinations that could exist wherein the first coverage area 208 is served with one or more different frequency, hardware, and power configurations than the second coverage area 210 that is conventionally impractical with managing multiple terrestrial-serving cells (e.g., because UE concentrations and terrestrial obstacles are rarely so starkly different between adjacent terrestrial cells).

Regardless of whether inter-cell interference is mitigated using space, frequency, and/or code separation, terrestrial cells such as the first coverage area 208 may utilize different network identifiers. Particularly in instances where a mobile network operator wishes to segment billing and access to airborne cells, terrestrial cells such as the first coverage area 208 may broadcast a first network identifier (e.g., a first PLMN), and airborne cells such as the second coverage area 210 may broadcast a second network identifier (e.g., a second PLMN). The terrestrial cells may utilize an MNO's home PLMN and the airborne cells may utilize a roaming PLMN that will cause the airborne UE 214 to seek and obtain specific permission to connect to and use the airborne cell. Further, the base station 202 or other components of the network 220, may limit access to the relevant PLMN based on a determination about whether a particular UE is airborne. For example, if it is determined that a UE is moving at greater than a threshold speed, then it may be determined that the UE is airborne and attachment to terrestrial (i.e., home) PLMN cells will be disallowed; conversely, if it is determined that the UE is at or near ground level, then attachment to roaming PLMNs associated with airborne cells will be disallowed.

Airborne cells, such as the second coverage area 210, may be specifically deployed in order to serve known airways. As used herein, airways are flight paths that can be considered "airborne highways." Airways are predefined paths in the sky that aircraft follow to ensure safe, efficient, and organized air travel. Typical airways include "V" (Victor) routes and "J" (Jet) routes, which are marked by radio navigation aids such as VHF omnidirectional range stations and nondirectional beacons, as well as "Q" and "T" routes, which use modern positioning technologies such as GPS. Airways typically exist as a series of segments between pre-defined waypoints, meaning that a significant number of aircraft will travel the same path on any given day. Base stations suitable for use with the present disclosure will preferably be located on or near the ground level equivalent of the airway and utilize beamforming or dedicated directional antennas (e.g., yagi or parabolic antennas) in order to transmit lobes that are co-axial and in-line with the airway so as to achieve higher gain and greater distance for aircraft on the airway. Alternatively, the base station 202 may utilize information about aircraft locations (e.g., automatic dependent surveillance broadcast (ADS-B)) to dynamically beamform the transmissions of the second panel 206 to target (and follow) one or more aircraft that are within range of the base station 202. In the case where the second panel 206 is a MIMO or massive MIMO array, a plurality of different airborne UEs could be targeted and/or followed with beamformed lobes simultaneously.

Figure 3:
FIG. 3 depicts a flow diagram of an exemplary method for providing airborne wireless service, in accordance with embodiments described herein.
Figure 3:
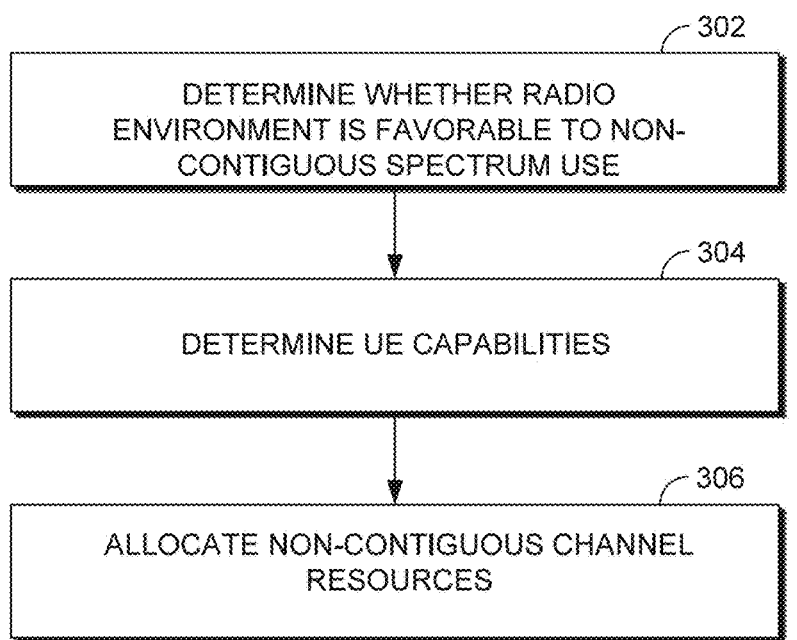

Turning now to FIG. 3, a flow chart representing a method 300 is provided. Generally the method 300 may be used by a user equipment (UE), such as the terrestrial UE 212 or the airborne UE 214 of FIGS. 2A and 2B, to perform targeted cell search operations. At a first step 302, the base station communicates a first set of wireless signals from a first antenna panel having a first tilt to a first coverage area, according to any one or more aspects described herein with respect to FIGS. 2A-2B. At a second step 304, the base station communicates a second set of wireless signals from a second antenna panel having a second tilt to a second coverage area, according to any one or more aspects described herein with respect to FIGS. 2A-2B. At step 306, one or more interference mitigation measures are implemented to prevent the first set of wireless signals from interfering with the second set of wireless signals, according to any one or more aspects described herein with respect to FIGS. 2A-2B.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A multi-antenna system comprising:
   a controller;
   a first antenna panel having a first tilt that is configured to communicate a first set of wireless signals to a first coverage area configured to serve a plurality of terrestrial user equipment (UEs); and
   a second antenna panel having a second tilt that is configured to communicate a second set of wireless signals to a second coverage area configured to serve a plurality of airborne UEs,
   wherein the controller is configured to:
      in response to a determination that a UE is terrestrial, serve the UE using the first antenna panel;
      in response to a determination that the UE is airborne, serve the UE using the second antenna panel;
      utilize one or more interference mitigation measures to prevent the first set of wireless signals from interfering with the second set of wireless signals;
   wherein the first antenna panel and the second antenna panel are separated by a vertical distance; and
   wherein determining whether the UE is airborne or terrestrial comprises comparing the UE's speed to a threshold.

2. The system of claim 1, wherein the system is terrestrial-based.

3. The system of claim 1, wherein the second coverage area does not comprise the ground level.

4. The system of claim 1, wherein the first set of wireless signals uses a first frequency and the second set of wireless signals uses a second frequency, wherein the first frequency and the second frequency are different.

5. The system of claim 4, wherein the first set of wireless signals has a first mobile country code mobile network code (MCC/MNC) and the second set of wireless signals has a second MCC/MNC, wherein the first MCC/MNC and the second MCC/MNC are different.

6. The system of claim 1, further comprising a predetermined angular distance that is an angular separation between the first set of wireless signals and the second set of wireless signals, wherein the predetermined angular distance reduces or prevents the first set of wireless signals from overlapping with the second set of wireless signals.

7. The system of claim 6, wherein a first frequency is used to communicate the first set of wireless signals and a second frequency is used to communicate the second set of wireless signals, wherein the first frequency and the second frequency are the same.

8. The system of claim 1, wherein a base station comprising the multi-antenna system is located within a predetermined distance of a known flight path.

9. The system of claim 1, wherein each of the first antenna panel and the second antenna panel comprise a plurality of antenna elements, and wherein the controller utilizes beamforming to define the second coverage area with the second set of wireless signals.

10. The system of claim 1, wherein the first antenna panel is coupled to the second antenna panel.

11. The system of claim 1, wherein determining the UE's speed comprises using automatic dependent surveillance-broadcast (ADS-B) data associated with an aircraft carrying the UE.

12. The system of claim 1, wherein the controller is further configured to disallow attachment of an airborne UE to the first coverage area.

13. A method for providing airborne wireless service, the method comprising:

communicating a first set of wireless signals from a first antenna panel having a first tilt to a first coverage area configured to serve a plurality of terrestrial user equipment (UEs);

communicating a second set of wireless signals from a second antenna panel having a second tilt to a second coverage area configured to serve a plurality of airborne UEs;

determining that a UE is airborne based on the UE's speed exceeding a threshold, and in response to determining that the UE is airborne, serving the UE using the second antenna panel;

utilizing, by a controller, one or more interference mitigation measures to prevent the first set of wireless signals from interfering with the second set of wireless signals; and wherein the first antenna panel and the second antenna panel are separated by a vertical distance.

14. The method of claim 13, wherein the method is performed by a terrestrial-based system.

15. The method of claim 13, wherein the first set of wireless signals uses a first frequency and the second set of wireless signals uses a second frequency, wherein the first frequency and the second frequency are different.

16. The method of claim 13, wherein the second coverage area does not comprise the ground level.

17. A non-transitory computer readable media having computer executable instructions stored thereon that, when executed by one or more computer processing components, cause the one or more computer processing components to perform a method of providing airborne wireless service to a user equipment (UE), the method comprising:

communicating a first set of wireless signals from a first antenna system to a terrestrial cell of a terrestrial base station, wherein the first set of wireless signals using a first frequency and comprising a synchronization signal having a first public land mobile network (PLMN) identifier;

communicating a second set of wireless signals from a second antenna system to an airborne cell of the terrestrial base station, the second set of wireless signals using a second frequency, and comprising a synchronization signal having a second PLMN identifier, the first frequency being different from the second frequency, the first PLMN identifier being different from the second PLMN identifier, and the airborne cell and the terrestrial cell having main lobes with a non-zero, positive angular separation in a vertical plane;

determining that the UE is airborne based on the UE's speed exceeding a threshold;

in response to determining that the UE is airborne, serving the UE using the second antenna system; and wherein the first antenna system and the second antenna system are separated by a vertical distance.

* * * * *